March 9, 1926.
G. E. HEDSTROM
1,575,916
FLUID BRAKE
Filed March 17, 1924
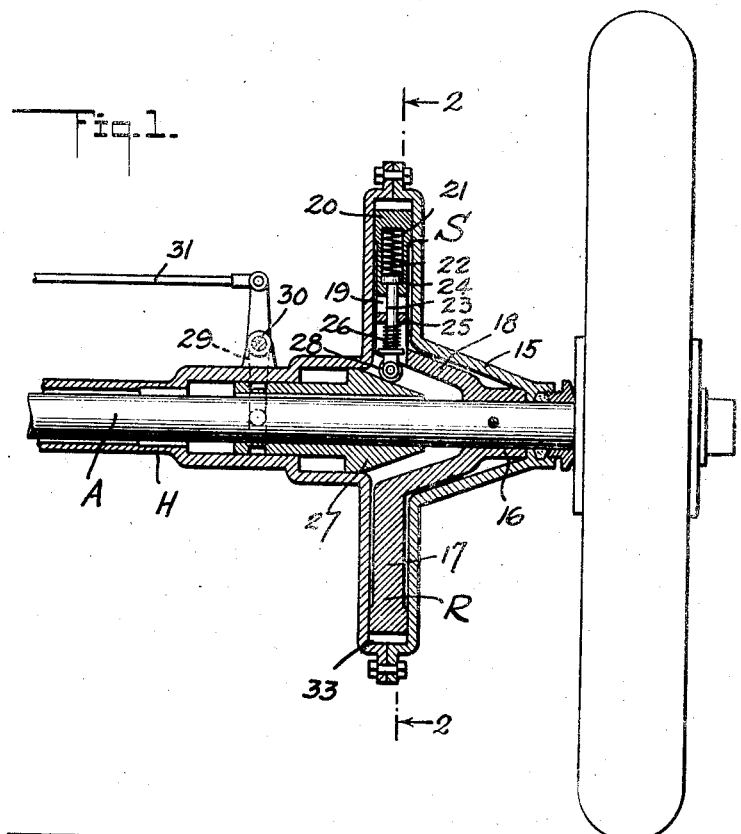
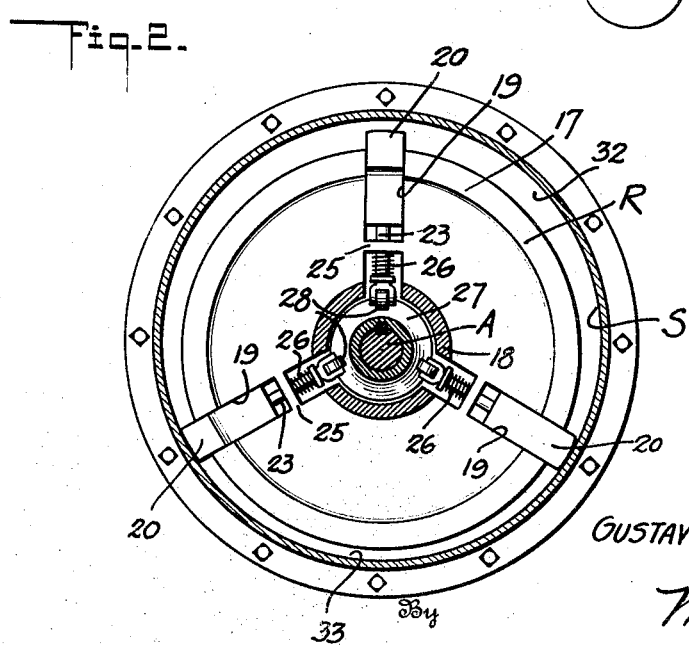
Inventor
GUSTAVE E. HEDSTROM
By Munn & Co.
Attorneys

Patented Mar. 9, 1926.

1,575,916

UNITED STATES PATENT OFFICE.

GUSTAVE E. HEDSTROM, OF LONG BEACH, CALIFORNIA.

FLUID BRAKE.

Application filed March 17, 1924. Serial No. 699,905.

*To all whom it may concern:*

Be it known that I, GUSTAVE E. HEDSTROM, a citizen of the United States, and a resident of Long Beach, in the county of Los Angeles and State of California, have invented certain new and useful Improvements in Fluid Brakes, of which the following is a specification.

My invention relates generally to apparatus employing a fluid for transmitting the motion of one element to another element which is normally at rest, or for bringing to a standstill an element which normally rotates. More particularly, the invention relates to fluid brakes for vehicles, and a purpose of my invention is the provision of a fluid brake of extremely simple, inexpensive and durable construction, which effectively utilizes the non-compressible quality of a liquid to brake a vehicle to any desired degree.

I will describe only one form of fluid brake embodying my invention, and will then point out the novel features thereof in claims.

In the accompanying drawings—

Figure 1 is a view showing in vertical section one form of fluid brake embodying my invention in applied position with respect to the axle of a motor vehicle;

Figure 2 is a vertical sectional view taken on the line 2—2 of Figure 1.

Referring specifically to the drawings, in which similar reference characters refer to similar parts, my invention in its present embodiment is shown as applied to the driving axle A of a motor vehicle, such axle being rotatable within a housing specially constructed to accommodate the fluid brake embodying my invention. As shown, the housing H is constructed to provide a stator S made up of flange sections bolted together, and one section being formed with a conical portion 15 to accommodate a high hub 16 of a rotor R. The hub portion 16 is keyed to the axle A so that the rotor rotates therewith, and the rotor includes a disk portion 17 connected to the hub through a conical portion 18. The disk portion 17 is adapted to rotate within the stator S, and is provided at regular spaced intervals with radially extending slots 19 in which are movably mounted abutments or vanes 20 adapted to extend from the periphery of the rotor disk so as to act upon a liquid contained in the stator. Each abutment or vane 20 is provided with a pocket 21 which receives an expansible spring 23 for yieldably urging the vane outwardly upon a stem 23. The stem extends into the pocket 21 and is provided with a head 24 engaged with the spring 22. A bearing or bridge plate 25 slidably receives the stem 23 and forms an abutment for a spring 26 which is employed for urging the stem into engagement with a cam 27. A roller 28 is mounted on the inner end of the stem 23 and has rolling contact with the cam 27.

The cam 27 is mounted for sliding movement on the axle A and within the housing H, but has a splined connection with the axle so as to rotate with the latter. A yoke 29 is operatively connected to the cam 27 and is pivoted at the point indicated at 30 so that it may be manually operated through the medium of a rod 31 to move the cam longitudinally on the axle, whereby the radial position of the several stems 23 can be varied at will.

As clearly shown in Figure 2, the rotor disk 17 is mounted eccentrically within the stator S so as to provide between the periphery of the disk and the inner periphery of the stator a chamber 32 for the reception of oil or other suitable liquid. By virtue of the eccentric mounting of the rotor the chamber 32 is provided with a passageway 33 of restricted area, and it is the flow of the oil through this restricted area which controls the rotation of the rotor through an adjustment of the abutments or vanes 20.

In practice, the cam 27 is normally adjusted so that the vanes 20 are substantially flush with the periphery of the rotor disk R, thereby allowing free circulation of oil in the chamber 32 and through the passageway 33 so that rotation of the rotor is restricted. This adjustment of the vanes 20 can be effected by retracting the cam so as to allow the stems 23 to move inwardly under the action of the springs 26, and as the stems move inwardly the heads 24 impart a similar movement to the vanes 20. When it is desired to retard the rotation of the axle A in effecting a braking of the vehicle the cam 27 is advanced to move the stems 23 radially, thereby causing a projection of the vanes 20 from the periphery of the rotor disk 17 by virtue of the partly rigid connection provided by the springs 21. As the vanes are projected the oil in advance of each vane is forced through the restricted passageway 33, thus setting up a resistance which tends to retard the rotation of the rotor. The resistance offered by the liquid depends upon the radial adjustment of the vanes 20 so that when the vanes are fully extended, they are in complete bridging relation with respect to the rotor and stator so that the escape of the liquid rearwardly with respect to the vanes is completely checked, and all of the liquid in advance of the vanes is forced to traverse the restricted passageway 33, thus setting up a maximum resistance and bringing the rotor to a standstill. With the vanes fully extended, it will be clear that in order for them to traverse the passageway 33 it is necessary that they yield inwardly. The connections between the stems and vanes allow for this movement, while the springs 21 return the vanes to fully extended position after they have passed the restricted passageway.

Although I have herein shown and described only one form of fluid brake embodying my invention, it is to be understood that various changes and modifications may be made herein without departing from the spirit of the invention and the spirit and scope of the appended claims.

What is claimed is:

1. A fluid brake comprising a sectional casing adapted to contain a fluid, an axle passing through the central portion of the casing, a cam, and means to permit the cam to be moved longitudinally on the shaft and to rotate therewith, a rotor functioning in said casing and secured to the shaft at one side of the vertical center of the casing, the position of the cam being to the opposite side of the vertical center of the casing, the rotor mounted in eccentric relation to the casing so as to provide a constant restricted space between the rotor and the inner face of the peripheral walls of the casing at one point of the latter, and a series of radially movable vanes in said casing adapted to co-act with said cam so as to be moved with respect to the inner face of the peripheral wall of the casing, and means for retracting said vanes on moving the cam in one direction.

2. A fluid brake comprising a fluid containing stator, a rotor mounted eccentrically in the stator, vanes movable radially in the rotor and extending between the rotor and stator, stems movable in the rotor, and with which the vanes are extensibly associated, heads on the stems for limiting the extensibility of the vanes outwardly with respect to the stems, yieldable elements for urging the vanes to fully extended position, adjustable means for moving the stems to effect radial adjustment of the vanes, and means for yieldably urging the stems into engagement with said means.

3. A fluid brake comprising a fluid containing stator, an axle extending through the stator, a cam slidable on and rotatable with the axle, a rotor fixed to the axle and disposed eccentrically within the stator to provide a restricted passageway between the rotor and stator, vanes movable radially in the stator and rotatable therewith to traverse the restricted passageway, stems movable in the rotor and with which the vanes are extensibly associated, heads on the stems for limiting the extensibility of the vanes outwardly with respect to the stems, means for yieldably urging the vanes to fully extended position, rollers on the stems having contact with said cam, means for urging the stems toward said cam, and means for adjusting the cam on said axle whereby the stems are moved radially to vary the radial position of said vanes.

4. In a fluid brake, a rotor having an offset hub portion, vanes movable radially in the rotor, and a cam movable to vary the position of the vanes radially in the rotor, said hub portion being formed to accommodate the cam.

5. A fluid brake comprising a sectional casing, an axle housing connected to the casing, a rotor in the casing adapted to be secured to an axle in the housing so as to provide between the casing and rotor an annular chamber having a restricted portion, vanes movable radially in the rotor, means for urging the vanes outwardly of the rotor, and a cam movable in the casing to vary the radial position of the vanes.

6. In a fluid brake, a sectional stator having a laterally disposed axial portion, a rotor mounted eccentrically in the stator and having an offset hub portion disposed in said axial portion, vanes movable radially in the rotor and extending between the latter and said stator, and means for adjusting the vanes radially, including a cam movable in the axial portion.

GUSTAVE E. HEDSTROM.